United States Patent
Pan

(10) Patent No.: US 10,048,111 B2
(45) Date of Patent: Aug. 14, 2018

(54) SMART WEIGHT SCALE, SMART WEIGHT MANAGEMENT SYSTEM BASED ON INTERNET OF THINGS AND METHOD OF MEASURING WEIGHT THEREOF

(71) Applicant: EBM TECHNOLOGIES INCORPORATED, Taipei (TW)

(72) Inventor: William Pan, Taipei (TW)

(73) Assignee: EBM TECHNOLOGIES INCORPORATED, Taipei (TW)

(*) Notice: Subject to any disclaimer, the term of this patent is extended or adjusted under 35 U.S.C. 154(b) by 186 days.

(21) Appl. No.: 15/187,701

(22) Filed: Jun. 20, 2016

(65) Prior Publication Data

US 2017/0176239 A1 Jun. 22, 2017

Related U.S. Application Data

(60) Provisional application No. 62/270,044, filed on Dec. 21, 2015.

(30) Foreign Application Priority Data

Mar. 30, 2016 (TW) .............................. 105109981 A

(51) Int. Cl.
*G01G 19/44* (2006.01)
*G01G 23/36* (2006.01)

(52) U.S. Cl.
CPC ............. *G01G 19/44* (2013.01); *G01G 23/36* (2013.01)

(58) Field of Classification Search
CPC ................................ G01G 19/44; G01G 23/36
See application file for complete search history.

(56) References Cited

U.S. PATENT DOCUMENTS

| | | | |
|---|---|---|---|
| 6,038,465 A * | 3/2000 | Melton, Jr. | A61B 5/1171 600/407 |
| 6,403,897 B1 * | 6/2002 | Bluth | A61B 5/0002 128/920 |
| 6,692,436 B1 * | 2/2004 | Bluth | A61B 5/0002 128/904 |
| 6,781,067 B2 * | 8/2004 | Montagnino | G01G 19/44 177/142 |
| 7,170,016 B2 * | 1/2007 | Dumornay | G01G 19/44 177/245 |
| 7,275,690 B1 | 10/2007 | White | |
| 7,557,310 B2 * | 7/2009 | Lai | G01G 23/3707 177/25.13 |
| 7,679,520 B2 * | 3/2010 | Zerhusen | A47B 23/046 340/573.1 |
| 8,203,459 B2 * | 6/2012 | Jones | G06Q 10/06 177/136 |

(Continued)

FOREIGN PATENT DOCUMENTS

| | | |
|---|---|---|
| TW | M372505 U1 | 1/2010 |
| TW | I416363 B | 11/2013 |
| WO | 2007102708 A1 | 9/2007 |

*Primary Examiner* — Randy Gibson
(74) *Attorney, Agent, or Firm* — Winston Hsu

(57) ABSTRACT

A method of measuring body weight includes receiving a first weight of a user wearing at least one personal item, reading a tag information for indicating a weight corresponding to the at least one personal item, and comparing a difference between the first weight and the weight corresponding to the at least one personal item to compute a second weight, wherein the second weight is a body weight of the user.

16 Claims, 4 Drawing Sheets

(56) References Cited

U.S. PATENT DOCUMENTS

| | | | | |
|---|---|---|---|---|
| 8,393,361 | B2* | 3/2013 | Luchinger | G01G 13/02 |
| | | | | 141/332 |
| 8,441,365 | B2* | 5/2013 | Jones | G06Q 10/06 |
| | | | | 340/541 |
| 8,639,226 | B2* | 1/2014 | Hutchings | G01G 19/44 |
| | | | | 455/41.2 |
| 8,669,861 | B1 | 3/2014 | Meyers | |
| 8,704,110 | B2* | 4/2014 | Forshaw | G01G 19/44 |
| | | | | 177/238 |
| 9,157,787 | B2* | 10/2015 | Sharma | G01G 19/44 |
| 9,463,126 | B2* | 10/2016 | Zerhusen | G08C 17/02 |
| 9,770,206 | B2* | 9/2017 | Ashokan | A61B 5/4872 |
| 2010/0299074 | A1* | 11/2010 | Chang | A01K 5/00 |
| | | | | 702/19 |
| 2011/0240379 | A1* | 10/2011 | Forshaw | G01G 19/44 |
| | | | | 177/1 |
| 2012/0241227 | A1* | 9/2012 | Rogers | G01G 19/44 |
| | | | | 177/1 |
| 2014/0063180 | A1* | 3/2014 | Sharma | G08C 19/00 |
| | | | | 348/36 |
| 2014/0083779 | A1* | 3/2014 | Sharma | G01G 19/44 |
| | | | | 177/1 |
| 2014/0236629 | A1* | 8/2014 | Kim | G06F 19/327 |
| | | | | 705/3 |

* cited by examiner

SMART WEIGHT SCALE, SMART WEIGHT MANAGEMENT SYSTEM BASED ON INTERNET OF THINGS AND METHOD OF MEASURING WEIGHT THEREOF

CROSS REFERENCE TO RELATED APPLICATIONS

This application claims the benefit of U.S. Provisional Application No. 62/270,044, filed on Dec. 21, 2015, the contents of which are incorporated herein.

BACKGROUND OF THE INVENTION

1. Field of the Invention

The present invention provides a smart weight scale, smart weight management system and method of measuring weight thereof for measuring body weight of user who is wearing personal items.

2. Description of the Prior Art

In medical and healthcare management fields, there are points of healthcare facilitated in public places such as hospital and clinic, company, school, public authority, to provide basic health check service such as body weight measurement to users. However, measured body weight often includes weights of personal items wore on the user to be inaccurate. Therefore, the user should take off as many clothes and personal items (e.g., shoes, jackets, hats and so on) as possible in order to make the measured body weight more accurate, however, which brings inconveniency to the user. Especially when there are many users, e.g., routine health examination for groups, taking off clothes brings longer preparation time and lengthy health examination procedure.

Furthermore, with the rise of medical and healthcare management, more and more users begin paying attention to their body weights to record daily body weight variations for body weight management, so the demand for body weight measurement increases. However, a smart weight management system for body weight management is rare or not existed in the industry.

Therefore, how to provide convenient, instant and accurate body weight measurement service to the user has become a topic in the industry.

SUMMARY OF THE INVENTION

It is therefore an objective of the present invention to provide a smart weight scale, smart weight management system and method of measuring body weight thereof for providing convenient, instant and accurate body weight measurement service under a circumstance that a user is wearing personal items.

The present invention discloses a smart weight management system, smart weight scale and method of measuring body weight thereof. The smart weight management system is designed based on Internet of Things (IoT), which includes a smart weight scale, at least one radio-frequency identification (RFID) tag, a communication network equipment and a cloud server. The smart weight scale and the RFID tag belong to device level of IoT for measuring body weight of the user and collecting user information, to achieve sensing and monitoring to target users in different application scenes. The RFID tag can be embedded into personal items such as clothes, shoes, and hats, and any kinds of wearable devices. The RFID tag stores information including personal information of the user and their personal items, such as user identity, measurement time, measurement location, names of personal items and corresponding item weights. The communication network equipment belongs to connect level of IoT, and the cloud server belongs to manage level of IoT, where the cloud server realizes functionality of the smart weight management system by executing specific software applications and computations.

The smart weight scale collects weight data via the load cells, reads information of time and location via real-time clock (RTC) and global positioning system (GPS) module, reads the tag information via the RFID reader, and then computes the body weight of the user not wearing the personal items according to the tag information and the weight data. Finally, the body weight of the user and information of time and location are transmitted to communication network equipment via the communication module to upload to the cloud server. Therefore, under the structure of IoT, applying the above mentioned operations and computations with the smart weight scale, the communication network equipment and the cloud server, the smart weight management system of the present invention provides convenient, instant, and accurate body weight measurement service to the user.

These and other objectives of the present invention will no doubt become obvious to those of ordinary skill in the art after reading the following detailed description of the preferred embodiment that is illustrated in the various figures and drawings.

DETAILED DESCRIPTION

The present invention aims at combining applications of Internet of Things (IoT) to design a smart weight management system and smart weight scale for body weight management, to provide convenient, instant and accurate body weight measurement service to the user.

First, IoT aims at sharing information of smart things via unified and standardized protocols. Similar technology includes Wireless Sensor Network (WSN) and Cyber-Physical System (CPS). The wireless sensor network comprises wireless data sink and multiple sensors, where information collection is usually restricted in local networks. The cyber-physical system is able to activate instruction and corresponding action based on different events, but the cyber-physical system is independent from others, where information exchange between multiple cyber-physical systems is prohibited, and the instruction and corresponding action can be performed for single event at one time. Therefore, the presence of IoT allows the cyber-physical system or wireless sensor network to communicate with each other and perform information exchange with each other, so a central message processing system can perform data integration and analysis for various types of information in consideration of multiple events, instead of single event.

IoT includes device, connect and manage levels. The device level performs sensing and monitoring based on different scenes. The device level includes equipment capable of sensing, identifying and communicating, such as wireless Radio Frequency Identification (RFID) tag and RFID reader, Global Positioning System (GPS) device, image processing device, and sensors for detecting temperature, humidity, infrared, acceleration, photometry, pressure, sound volume, and so on. The connect level transmits data collected in the device level to the central message processing system (e.g., cloud server or cloud database) via wired or wireless communication network to perform data integration and analysis in consideration of multiple events. Professional techniques in multiple fields are integrated and converged in the connect level, where specific software application systems are developed based on various requirements, e.g., smart bus system, smart healthcare management system, logistics management system, and so on. Hence, IoT realizes the construction of information management, storage, and share of things via cloud computation, which facilitates interactions between human and things and interactions between things and another thing.

Figure 1:
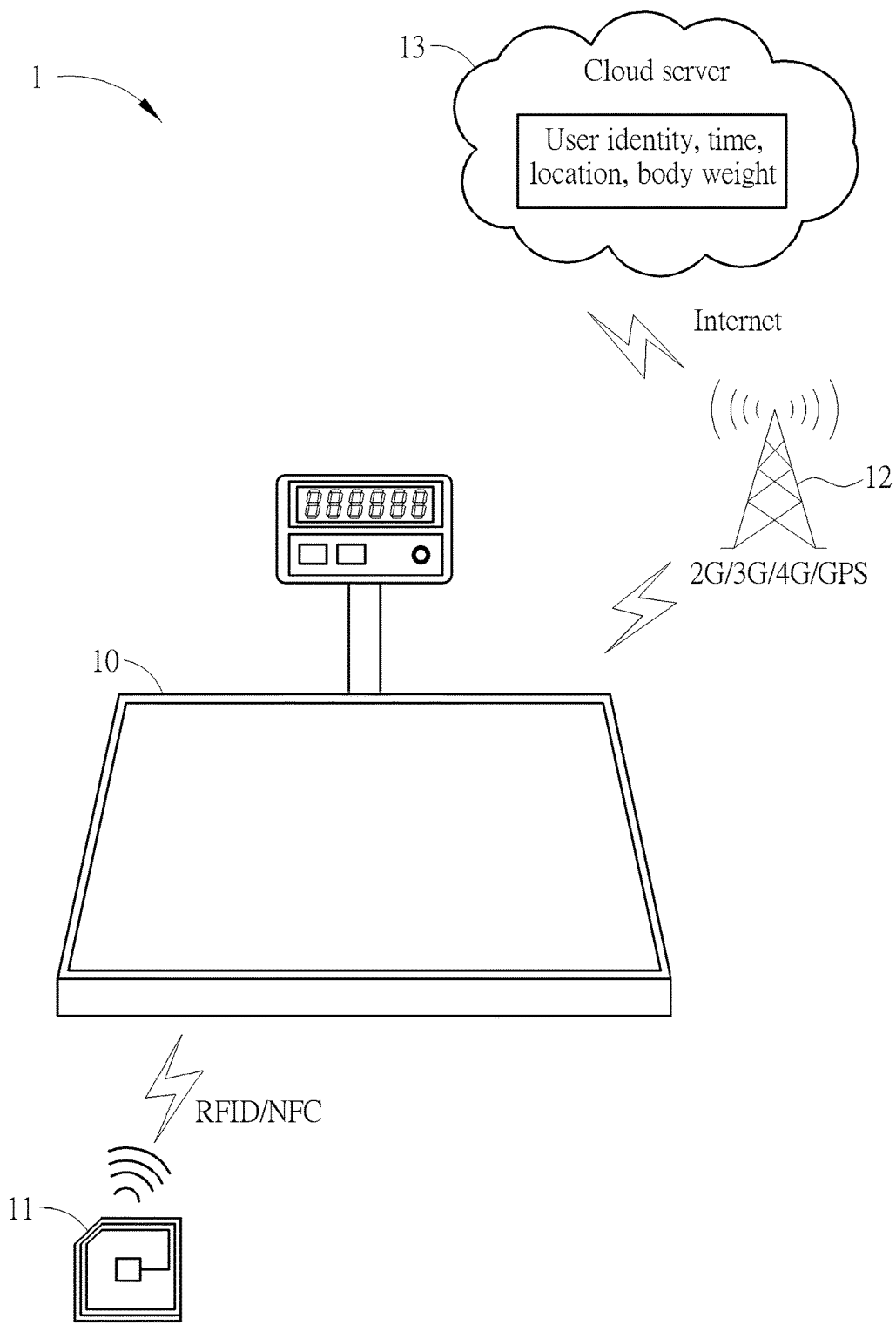
FIG. 1 is a schematic diagram of a smart weight management system according to an embodiment of the present invention.

FIG. 1 is a schematic diagram of a smart weight management system 1 according to an embodiment of the present invention. The smart weight management system 1 includes a smart weight scale 10, at least one RFID tag 11, a communication network equipment 12 and a cloud server 13. The smart weight management system 1 is constructed under IoT, where the smart weight scale 10 and the RFID tag 11 belong to the device layer of IoT for respectively measuring body weight of the user and sensing user information, to perform sensing and monitoring for various applications and users. The RFID tag 11 can be embedded into personal items such as clothes, shoes, hats, and any kinds of wearable devices. The RFID tag 11 stores information of the user and their personal item, such as user identity, measurement time, measurement location, names of personal items and weights corresponding to the personal items, and so on.

The smart weight scale 10 further includes an RFID reader for reading the tag information stored in the RFID tag 11. The smart weight scale 10 is equipped with wired and wireless communication functions to transmit the body weight and user information to the communication network equipment 12 via wired and wireless communications. The communication network equipment 12 belongs to the connect level of IoT, and synchronously uploads the body weight and user information to the cloud server 13 via the Internet and based on network communication protocols including Hyper Text Transfer Protocol (HTTP) and Transmission Control Protocol (TCP). Therefore, the cloud server 13 can perform centralized data integration, data analysis and data storage. The cloud server 13 belongs to the manage level of IoT, and executes specific application software programs to realize the functionality of the smart weight management system 1.

Specifically, the application software programs executed by the smart weight management system 1 allows groups or individuals to create user accounts, so the cloud server 13 can record the body weight of the user in corresponding user accounts according to the user information read by the smart weight scale 10. The cloud server 13 performs statistic computations according to previously recorded data and the latest data for tracking body weight variations of the user. Meanwhile, the user can log in the user account of the smart weight management system 1 via personal communication devices (e.g., handheld devices, tablet computers, personal computers) to search and track body weight records.

Noticeably, when the user is wearing the personal items, the smart weight scale 10 eliminates the item weights from a total weight according to information associated with the personal item and corresponding item weights stored in the RFID tag 11, so as to compute the body weight of the user, and then the body weight of the user is uploaded to the cloud server 13 by the communication network equipment 12. As a result, by combining IoT, the smart weight scale 10 can automatically compute the accurate body weight of the user and then upload it to the cloud server 13, so the smart weight management system 1 can provide convenient, instant and accurate body weight measurement service. Especially for routine health check for groups with many users, the smart weight management system 1 can simplify preparations for body weight measurement and shorten measurement time to speed up the routine health check for groups.

Figure 2:
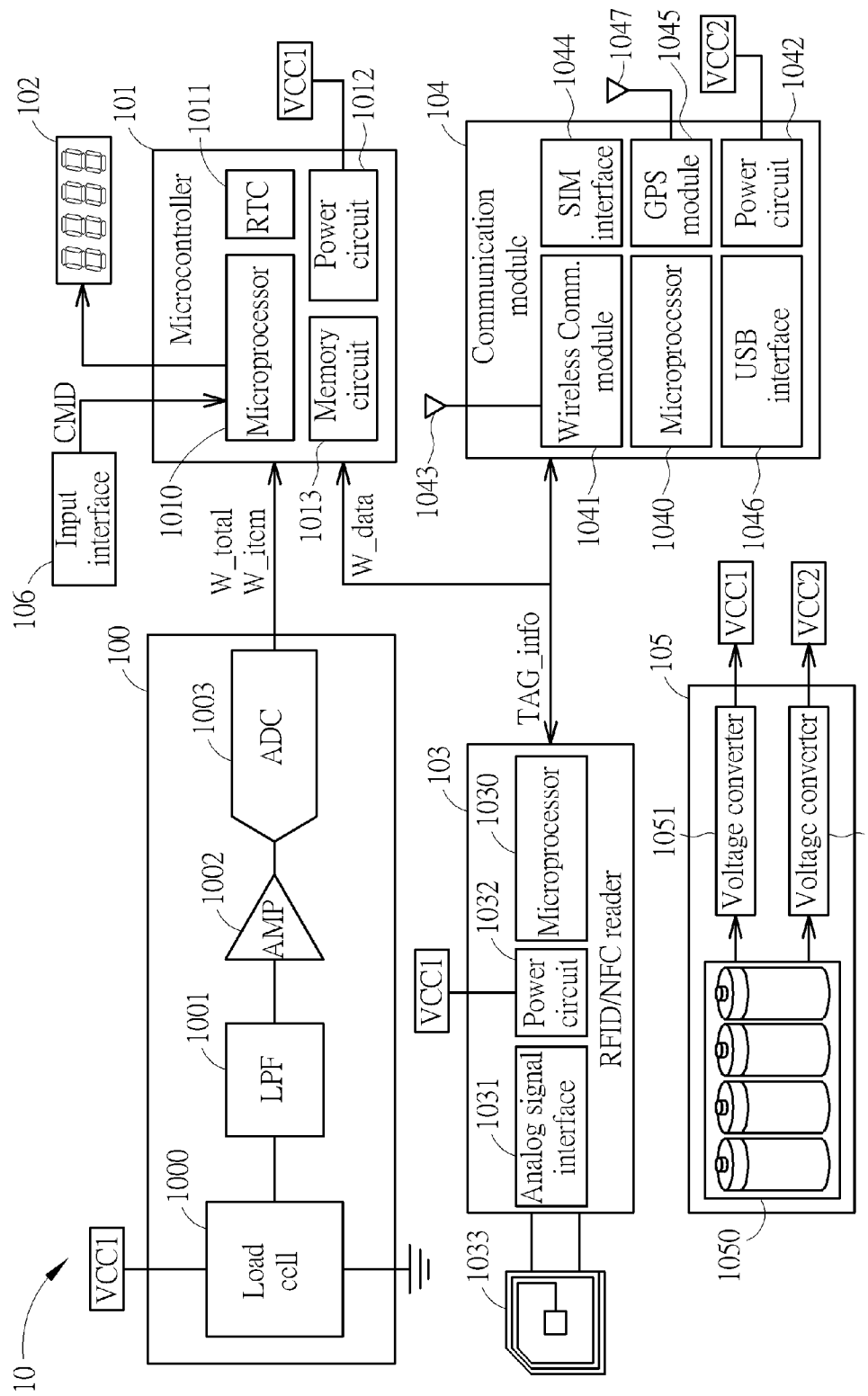
FIG. 2 is a functional block diagram of the smart weight scale in FIG. 1 according to an embodiment of the present invention.

FIG. 2 is a functional block diagram of the smart weight scale 10 according to an embodiment of the present invention. The smart weight scale 10 includes a load module 100, a microcontroller 101, a display device 102, a reader 103, a communication module 104, a battery module 105 and an input interface 106.

The load module 100 is coupled to the microcontroller 101 for generating weight data to the microcontroller 101, and includes at least one load cell 1000, a low pass filter (LPF) 1001, an operational amplifier (AMP) 1002 and an analog-to-digital converter (ADC) 1003. In general, when the load module 100 does not detect any weight, the smart weight scale 10 stays in a sleep mode for power saving; when the load module 100 keeps detecting a weight for a period of time, the load module 100 generates a wake-up signal to the microcontroller 101 for activating the microcontroller 101 to enter a working-mode and receive the weight data.

In operation, when the user stands on the smart weight scale 10, or when the personal item is placed on the smart weight scale 10, the load cell 1000 senses the body weight of the user or the weight of the personal item to generate the weight data with analog signal form, and the weight data with analog signal form is processed with filtering, amplifying and digital signal conversion via the LPF 1001, the AMP 1002 and the ADC 1003, to generate the weight data with digital signal form to the microcontroller 101. In other words, when the user who wears the personal item stands on the smart weight scale 10, the load module 100 generates a total weight data W_total including the personal item weight and the body weight; when the personal item is placed on the smart weight scale 10, the load module 100 generates the item weight data W_item.

The microcontroller 101 is coupled to the load module 100, the display device 102, the reader 103, the communication module 104, the battery module 105 and the input interface 106, and includes a microprocessor 1010, a Real-Time Clock (RTC) 1011, a power circuit 1012 and a memory circuit 1013. The RTC 1011 provides measurement time when the weight data W_total or the item weight data W_item is measured. The power circuit 1012 receives the supply voltage VCC1 to drive the microcontroller 101. The memory circuit 1013 can be any kinds of data storage device for storing processing results of the microcontroller 101, the weight data W_total, the item weight data W_item, and the tag data read by the reader 103. The memory circuit 1013 can be a read-only memory (ROM) device or a random-access memory (RAM) device.

The microprocessor 1010 obtains the names of the personal items wore on the user and corresponding item weights (given that a total weight of all items wore on the user is the item weight data W_item) according to the tag information TAG_info read by the reader 103. Thus, the microprocessor 1010 eliminates the item weight data W_item from the total weight W_total to compute the weight data W_data which is the accurate body weight of the user (i.e., the user's body weight data W_data=W_total−W_item). Then, the microprocessor 1010 determines whether to transmit the weight data W_data to the display device 102 and the communication module 104 according to the command CMD generated by the input interface 106, so the display device 102 displays the number corresponding to the weight data W_data, and the communication module 104 uploads the weight data W_data to the cloud server 13. The microprocessor 1010 can be an application-specific integrated circuit (ASIC) for handling information reception and transmission and data processing for hardware interfaces such as Inter-Integrated Circuit (I2C), Universal Asynchronous Receiver/Transmitter (UART), Serial Peripheral Interface Bus, (SPI), General Purpose Input/Output (GPIO).

The display device 102 is coupled to the microcontroller 101 for displaying the number corresponding to the total weight data W_total or the item weight data W_item, the user information and other relative information. The input interface 106 is coupled to microcontroller 101 for generating the command CMD to the microcontroller 101 to control operations of the smart weight scale 10, where the input interface 106 can be a keyboard, a touch control input interface, or any types of input interface. For example, the user utilizes the smart weight scale 10 to measure the item weight data W_item, and then the item weight data W_item can be written into the RFID tag 11. In operation, the user follows instructions from the display device 102 to perform a registry procedure via the input interface 106, herein the smart weight scale 10 operates as a normal scale to measure the item weight data W_item, and then writes names of the personal items and corresponding item weight data W_item into the RFID tag 11, where the writing operation can be realized by the reader 103. When the smart weight scale 10 operates as a scale, the display device 102 displays numbers corresponding to the item weight data W_item; on the other hand, when the smart weight scale 10 operates a normal body weight scale (e.g., the user does not apply an account in the smart weight management system 1 if the reader 103 does not detect a valid RFID tag), the display device 102 simply displays the measured weight. Or, if the reader 103 detects a valid RFID tag 11, the display device 102 displays the user data read by the reader 103 for identity confirmation.

The reader 103 is coupled to the microcontroller 101, the communication module 104 and the battery module 105. The reader 103 includes a microprocessor 1030, an analog signal interface 1031, a power circuit 1032, and a coil 1033. The reader 103 can be an RFID reader for reading the user information with analog signal form stored in the RFID tag 11 via the coil 1033, and converting the user information with analog signal form into digital signal form via the microprocessor 1030, to generate the tag information TAG_info to the microcontroller 101 and the communication module 104. In one embodiment, the reader 103 further performs a function of near filed communication (NFC) for reading the user information stored in the RFID tag 11 via NFC, to generate the tag information TAG_info to the microcontroller 101 and the communication module 104. The power circuit 1032 receives the supply voltage VCC1 to drive the reader 103.

The communication module 104 is coupled to the microcontroller 101, the reader 103 and the battery module 105, and includes a microprocessor 1040, a wireless communication module 1041, a power circuit 1042, a Subscriber Identity Module (SIM) 1044, a Global Positioning System (GPS) module 1045, a Universal Serial Bus (USB) interface 1046 and antennas 1047 and 1043. The communication module 104 transmits data collected by the device level to the cloud server 13 via wired or wireless communication network. The power circuit 1042 receives the supply voltage VCC2 to drive the communication module 104.

Regarding wireless communication, the wireless communication module 1041 supports second/third/fourth generation (2G/3G/4G) communication technology, or any applicable mobile communication technology. During wireless signal transmission, the wireless communication module 1041 encodes and modulates the tag information TAG_info and the user weight data W_data into wireless signals which can be decoded and demodulated by devices supporting 2G or 3G or 4G mobile communication technology, and radiates the wireless signals in the air by the antenna 1043, to upload the weight data W_data and the tag information TAG_info to the cloud server 13. During wireless signal reception, the wireless communication module 1041 induces the wireless signals in the air by the antenna 1043, and receives data from the cloud server 13 by demodulation and decoding. Therefore, by the above mentioned operations, the wireless communication module 1041 can realize wireless communication. The SIM interface 1044 provides the user identity of the smart weight scale 10 for user registry and identification between the communication network equipment 12 and the telecommunication operators. In addition, the GPS module 1045 receives positioning signals from the satellite via the satellite antenna 1047 to provide the position information to the cloud server 13. In one embodiment, the communication module 104 further includes a Bluetooth module, a Wi-Fi module or a Zigbee module to directly or indirectly connect with the communication network equipment 12 via various wireless communication techniques.

Regarding wired communication, the USB interface 1046 connects to external storage devices or external computer devices to output the tag information TAG_info and the weight data W_data. For example, the user can download the tag information TAG_info and the weight data W_data to personal mobile devices via the USB interface 1046. In one embodiment, the communication module 104 further includes an Ethernet module and an Ethernet port for transmitting the tag information TAG_info and the weight data W_data to the cloud server 13 via wired Internet.

The battery module 105 includes a plurality of batteries 1050 and voltage converters 1051 and 1052 for converting battery power into the supply voltages VCC1 and VCC2 via the voltage converters 1051 and 1052 to drive elements comprised in the smart weight scale 10. For example, the battery module 105 provides the supply voltage VCC1 to the load cell 1000 and the power circuits 1012 and 1032 to drive the load module 100, the microcontroller 101 and reader 103. The battery module 105 provides the supply voltage VCC2 to the power circuit 1042 to drive the communication module 104. In one embodiment, the supply voltages VCC1 and VCC2 can be respectively 3.3 volts and 1.8 volts, however, the supply voltage can be adjusted according to practical requirements, which is not limited.

Figure 3:
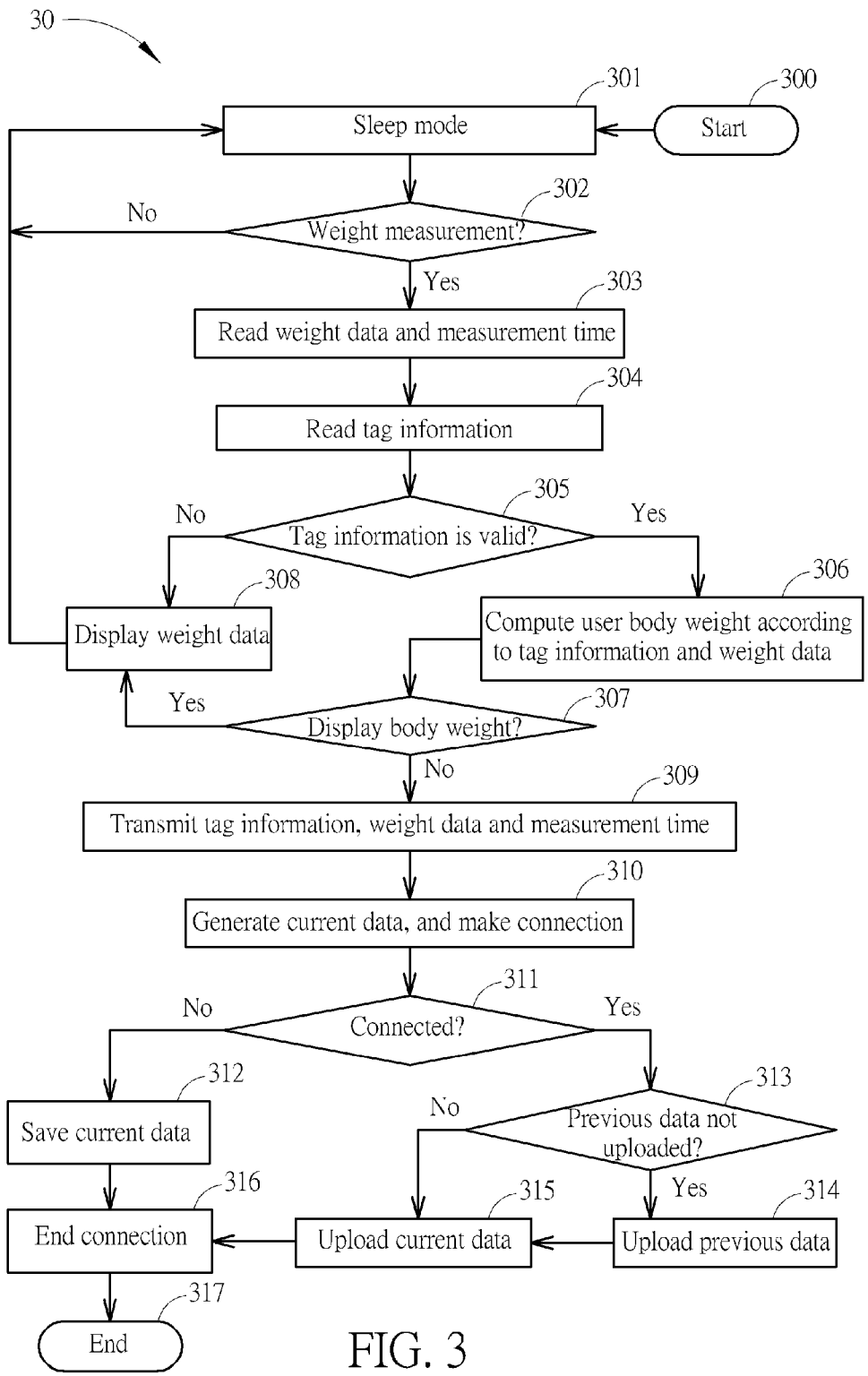
FIG. 3 is a flowchart of process according to an embodiment of the present invention.

Under the circuit structure as mentioned above, the smart weight scale 10 can achieve automatic user body weight measurement and data upload to the cloud server 13 when the user is wearing personal items. Operations of the smart weight scale 10 can be summarized into a process 30. As shown in FIG. 3, the process 30 can be software applications utilized in IoT. The process 30 can be complied into a program code to be saved in the memory device (e.g., the memory circuit 1013) of the smart weight scale 10 for instructing the smart weight scale 10 to provide body weight measurement service. The process 30 includes the following steps.

Step 300: Start.

Step 301: Stay in sleep mode.

Step 302: Determine whether to perform weight measurement. Go to Step 303 if yes; return to Step 301 if no.

Step 303: Read weight data by load module and read measurement time by real-time clock.

Step 304: Wake up the reader, and read the tag information by the reader.

Step 305: Determine whether the tag information is valid. Go to Step 306 if yes; go to Step 308 if no.

Step 306: Compute user body weight according to the tag information and the weight data.

Step 307: Receive command by input interface to determine whether to display the body weight in display device. Go to Step 308 if yes; go to Step 309 if no.

Step 308: Display weight data by the display device. Return to Step 301.

Step 309: Wake up communication module, and transmit the tag information, the weight data and the measurement time to the communication module.

Step 310: Perform encoding and packaging to the tag information, the weight data and the measurement time by the communication module to generate current data, and make connection with the cloud server.

Step 311: Determine whether the communication module is connected with the cloud server. Go to Step 313 if yes; go to Step 312 if no.

Step 312: Save the current data as previous data. Go to Step 316.

Step 313: Determine whether the previous data in not uploaded to the cloud server. Go to Step 314 if yes; go to Step 315 if no.

Step 314: Upload the previous data to the cloud server.

Step 315: Upload the current data to the cloud server.

Step 316: End connection from the cloud server.

Step 317: End.

According to the process 30, in Step 301 to Step 303, the smart weight scale is defaulted staying in the sleep mode (Step 301), and the smart weight scale determines whether to perform weight measurement according to detection results of the load module when the user stands on the smart weight scale (Step 302). If weight measurement is not needed, the smart weight scale returns to the sleep mode. If weight measurement is needed, the smart weight scale reads the weight data (i.e., a total weight that the user is wearing personal items) by the load module, and reads corresponding measurement time by the RTC (Step 303). In one embodiment, the smart weight scale further reads corresponding measurement location by the GPS module.

In Step 304 to Step 309, the smart weight scale wakes up the reader to rad the tag information by the reader (Step 304), where the tag information indicates the user identity, the measurement time, the measurement location, the names of personal item and corresponding weights of the personal item. The smart weight scale determines whether the tag information is valid or not (Step 305). If the tag information is valid, the smart weight scale computes the body weight of the user who is not wearing personal items according to the tag information and the weight data (Step 306). The smart weight scale receives the command by the input interface, to determine whether to display the actual body weight in the display device (Step 307). If the command indicates displaying the user body weight, the display device of the smart weight scale displays the user body weight (Step 308), and then returns to the sleep mode; if the command indicates not displaying the actual body weight, the smart weight scale wakes up the communication module, and transmits the tag information, the weight data and the measurement time to the communication module (Step 309).

In Step 310 to Step 316, the smart weight scale performs encoding and packaging to the tag information, the weight data and the measurement time by the communication module, to generate the current data, and make a connection with the cloud server (Step 310). Afterwards, the smart weight scale determines whether the communication module is connected to the cloud server (Step 311). If communication module is connected to the cloud server (Step 312), the smart weight scale determines whether there is the previous data not uploaded to the cloud server (Step 313). If there is the previous data not uploaded, the communication module uploads the previous data in advance, and then uploads the current data (Step 314 to Step 315). If there is no previous data not uploaded, the communication module directly uploads the current data (Step 315). When the communication module cannot connect to the cloud server, the smart weight scale saves the current data as the previous data, and uploads it as soon as the communication module is connected to the cloud server. Finally, once all data (including the previous and the current data) is uploaded, or the previous data cannot be uploaded is saved, the communication module ends connection from the cloud server (Step 316). The smart weight scale returns to the sleep mode in preparation for the next operation.

Noticeably, to ensure that the tag information is valid, the user should perform an identity registry procedure before measuring body weight. Specifically, each of the personal items owned by the user should be respectively weighted and recorded, or multiple personal items can be weighted together to record a total item weight. In one embodiment, the smart weight scale allows the user to choose which one of the personal items is wore on the user when measuring body weight via the display device and the input interface, which is benefit for computing the accurate body weight. Though weighting each of the personal items requires more efforts, which is more flexible and more accurate when measuring body weight. Once all the item weight is recorded, the user writes the user identity, names of the personal items and item weights corresponding to the personal items into the RFID tag (which is realized by the RFID in practice).

In short, by performing the process 30, the smart weight scale measures the weight data and obtains corresponding measurement time and location, then computes the body weight of the user without wearing personal items according to the tag information and the weight data, and finally uploads information of the body weight and the corresponding measurement time and location to the cloud server via the communication module. As a result, under the structure of IoT, applying the software application of the process 30 with the smart weight scale, the communication network equipment and the cloud server, convenient, instant and accurate body weight measurement service are provided to the user.

Figure 4:
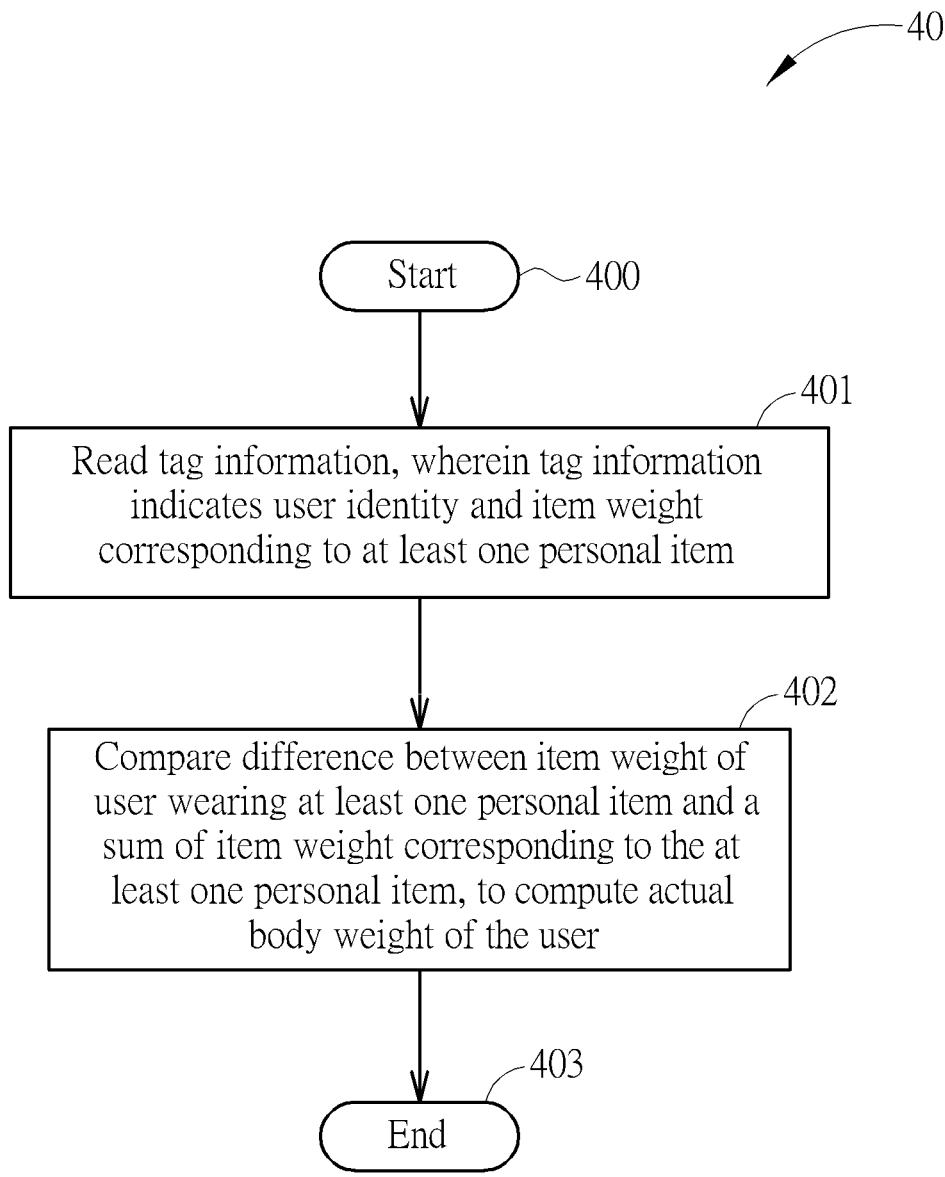
FIG. 4 is a flowchart of process according to an embodiment of the present invention.

In Step 306, detailed operations of the smart weight scale in computing the body weight of the user wearing the personal items according to the tag information and the weight data can be further summarized into a process 40, as shown in FIG. 4, the process 40 can be compiled into a program code to be saved in the memory device (e.g., the memory circuit 1013) of the smart weight scale 10 to compute the accurate body weight of the user. The process 40 includes the following steps.

Step 400: Start.

Step 401: Read a tag information, wherein the tag information indicates a user identity and a weight corresponding to at least one personal item.

Step 402: Compare a difference between the total weight of the user wearing at least one personal item and a sum of weights corresponding to each of the at least one personal item, to compute an actual body weight of the user.

Step 403: End.

According to process 40, the smart weight scale compares a difference between the total weight of the user wearing at least one personal item and the sum of weights corresponding to each of the at least one personal item, so as to compute the actual body weight of the user. As a result, the smart weight scale computes the actual body weight of the user wearing the personal item to provide convenient, instant and accurate body weight measurement service to the user.

To sum up, the smart weight scale of the present invention measures the weight data and obtains corresponding measurement time and location, then computes the body weight of the user without wearing personal items according to the tag information and the weight data, and finally uploads the body weight and corresponding measurement time and location to the cloud server by the communication module. As a result, under the structure of IoT, applying the software application of the process 30 with the smart weight scale, the communication network equipment and the cloud server, convenient, instant and accurate body weight measurement service are provided to the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart weight scale, for a smart weight management system, comprising:
   a load module for generating a first weight data;
   a reader for reading a tag information stored in a radio-frequency identification tag of the smart weight management system, wherein the tag information indicates at least one item and a weight corresponding to the at least one item;
   a microcontroller coupled to the reader and the load module for computing a second weight data according to the first weight data and the tag information; and
   a communication module coupled to the microcontroller and the reader for transmitting the second weight data to a cloud server of the smart weight management system, and comprising:
      a first microprocessor for encoding and packaging the second weight data, the tag information and a position information to generate a current data;
      a first antenna;
      a wireless communication module coupled to the first antenna and the first microprocessor for uploading the current data to the cloud server via the first antenna;
      a subscriber identity module interface coupled to the wireless communication module for providing a user identity of the smart weight scale;
      a second antenna for receiving a positioning signal from a satellite;
      a global positioning system module coupled to the second antenna and the first microprocessor for generating a position information to the first microprocessor according to the positioning signal; and
      a universal serial bus interface coupled to the first microprocessor for outputting the second weight data and the tag information to a computer device of a user.

2. The smart weight scale of claim 1, wherein the first weight data comprises the weight corresponding to the at least one item and the second weight data, and the second weight data is a body weight of a user.

3. The smart weight scale of claim 1, wherein the microcontroller comprises:
   a real-time clock for generating a measurement time;
   a memory circuit for storing the tag information, the first weight data, the second weight data, the measurement time and the position information; and
   a second microprocessor coupled to the real-time clock and the memory circuit for computing the second weight data according to the tag information and the first weight data;
   wherein the first microprocessor performs encoding and packaging to the measurement time to generate the current data.

4. The smart weight scale of claim 1, wherein the memory circuit stores the current data as a first previous data when the communication module is disconnected from the cloud server; or, the communication module uploads the second previous data before uploading the current data when the communication module is connected to the cloud server and the memory circuit stores the current data as a second previous data; or, the communication module uploads the current data when the communication module is connected to the cloud server and the memory circuit does not store the second previous data.

5. The smart weight scale of claim 1, wherein the reader is a radio-frequency identification reader a near field communication reader, the tag information is stored in the RFID tag, and the RFID tag is embedded in an item of a user.

6. The smart weight scale of claim 1, wherein the tag information further indicates a user identity, and the user identity is corresponding to an account of the smart weight management system.

7. The smart weight scale of claim 1, further comprising:
   a display device coupled to the microcontroller for displaying the first weight data or the second weight data;
   an input interface coupled to the microcontroller for generating a command to the microcontroller to instruct the display device to display the first weight data or the second weight data; and
   a battery module coupled to the load module, the reader, the microcontroller and the communication module for providing a first supply voltage to the load module, the reader and the microcontroller, and providing a second supply voltage to the communication module.

8. A smart weight management system, comprising:
   a cloud server;

a communication network equipment;

at least one radio-frequency identification (RFID) storing a tag information, wherein the tag information indicates at least one item and a weight corresponding to the at least one item; and a smart weight scale for providing a body weight measurement service, wherein the smart weight scale comprises a microcontroller and a memory circuit for storing a program code to instruct the microcontroller to execute a process for providing the body weight measurement service, and the process comprises:

by a load module, generating a first weight data;

by a reader, reading the tag information from the at least one RFID tag;

by the microcontroller, computing a second weight data according to the tag information and the first weight data;

by a communication module, performing encoding and packaging to the tag information and the second weight data to generate a current data; and by the communication module, connecting to the cloud server to upload the current data to the cloud server;

wherein the communication module comprises a global positioning system module, the communication module performs encoding and packaging to a positioning information to generate the current data, and the positioning information is generated by the global positioning system module.

9. The system of claim 8, wherein the first weight data comprises the weight corresponding to the at least one item and the second weight data, and the second weight data is a body weight of a user.

10. The system of claim 8, wherein the reader is a radio-frequency identification reader a near field communication reader, and the RFID tag is embedded in a item of a user.

11. The system of claim 8, wherein the process further comprising:

determining whether the tag information is valid; and by the microcontroller, computing the second weight data according to the tag information and the first weight data if the tag information is valid; or by a display device, displaying the first weight data if the tag information is invalid.

12. The system of claim 11, wherein if the tag information is valid, the process further comprises:

by a input interface, receiving a command for determining whether to display the second weight data in the display device; and by the display device, displaying the second weight data if the command indicates to display the second weight data; or transmitting the tag information and the second weight data to the communication module if the command indicates not to display the second weight data.

13. The system of claim 8, wherein the process further comprises:

determining whether the communication module is connected to the cloud server; and by the memory circuit, storing the current data as a first previous data if the communication module is disconnected from the cloud server; or by the communication module, uploading the second previous data before uploading the current data when the communication module is connected to the cloud server and the memory circuit stores the current data as a second previous data; or by the communication module, uploading the current data when the communication module is connected to the cloud server and the memory circuit does not store the second previous data.

14. The system of claim 8, wherein the communication module performs encoding and packaging to the tag information, the second weight data, a measurement time and the positioning information to generate the current data.

15. The system of claim 14, wherein the measurement time is read by a real-time clock.

16. The system of claim 8, wherein the tag information further indicates a user identity, and the user identity is corresponding to a personal an account of the smart weight management system.

* * * * *